Dec. 10, 1935.  H. J. SAVAGE  2,023,552
CHEMICAL APPORTIONING METHOD AND APPARATUS
Filed Aug. 25, 1934
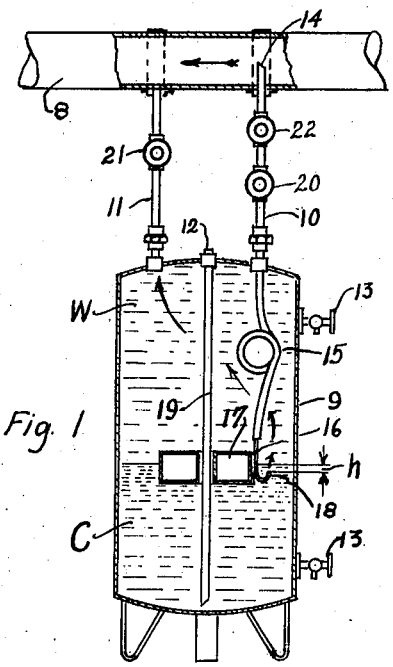
Fig. 1
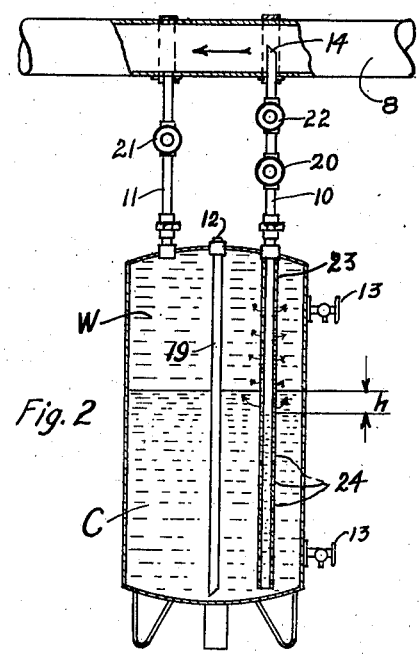
Fig. 2
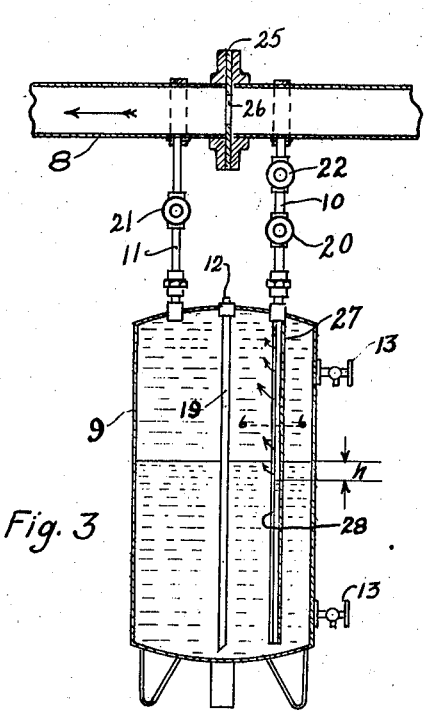
Fig. 3
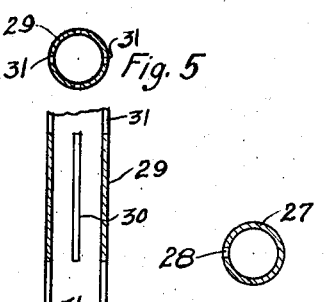
Fig. 5
Fig. 6
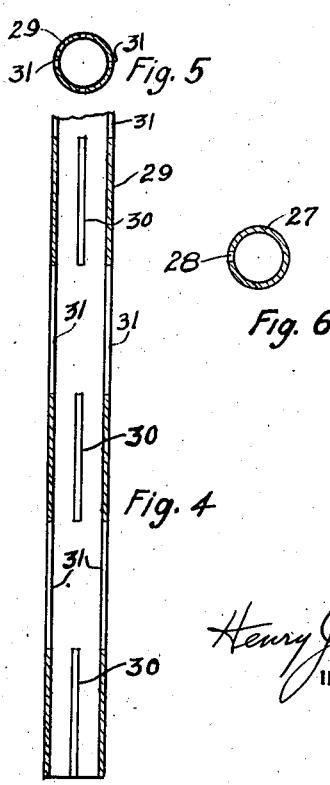
Fig. 4
Henry J. Savage
INVENTOR Patented Dec. 10, 1935

2,023,552

UNITED STATES PATENT OFFICE 2,023,552

CHEMICAL APPORTIONING METHOD AND APPARATUS

Henry J. Savage, Ridgewood, N. J.

Application August 25, 1934, Serial No. 741,469

6 Claims. (Cl. 210—38)

This invention relates to a new and improved method of and means for apportioning chemicals to a liquid supply, whereby any desired quality may be imparted to the liquid to be treated, and is in part a continuation of my application Ser. No. 620,969, filed July 5, 1932.

I accomplish this result in a new manner and with means which assures accurate control over the quantity of the chemical delivered to the supply to be treated, in a unique and simple manner.

Devices and methods heretofore used for this purpose have not been entirely satisfactory either because they are very erratic in their control over the chemicals to be fed, hence possess large inherent errors, or they resort to complicated and expensive apparatus in order to exercise a greater control of the chemicals to be delivered.

It has long been known that the addition of appropriate chemicals to a liquid supply, e. g. a water supply, can effect a modification of its chemical and physical properties. Thus the addition of a soluble alkali to a water containing carbon dioxide in solution will combine with the carbon dioxide to form a bicarbonate thereby reducing the corrosive properties of the water due to this compound. If a solution of aluminum sulphate or sodium aluminate be added to the water supply, these chemicals will combine with the calcium and magnesium compounds. The reaction between the alum or aluminate with these hardness forming constituents, results in a characteristic precipitate, or "floc" which entrains particles held in suspension by the water supply, thereby reducing the turbidity. In such an application the treated water is delivered to a retention basin to allow the precipitate to settle in the form of a sludge, which is periodically removed, while the clear water is delivered to the source of consumption, usually through a sand filter.

Another application is for the purpose of preventing corrosion in pipe lines due to dissolved carbon dioxide. In such case a solution of sodium silicate is delivered to the water supply, in appropriate concentration, whereby a relatively insoluble precipitate of silicates forms a protective coating upon the walls of the pipes. This insoluble protective silicate coating results from the chemical combination of the dissolved calcium and magnesium salts in the water supply forming the corresponding insoluble silicates, or with iron in the case of chalybeate waters forming iron silicates, all of which protect the walls of the conduit from further corrosion. The free alkali of the sodium silicate combines with the carbon dioxide to form sodium bicarbonate thus removing this source of corrosion, or additional free alkali may be added to the silicate to accomplish the removal of the carbon dioxide.

In still another application sodium sulphite solution may be introduced in the water supply to combine with the dissolved oxygen, thus reducing the corrosive tendency of boiler feed waters.

All of the above applications in a broad sense are well known in the art of water treatment, and I do not claim them as my invention except as they may be accomplished by or pertain to my improved process or apparatus for carrying them out.

In all cases, the successful application depends upon the addition of the requisite amount of chemicals delivered to the water supply. These may be calculated by well known methods or an arbitrary amount of chemicals may be introduced and the quantity increased or decreased to suit conditions, by an adjustment of the feeding device.

My invention accomplishes the feeding or apportioning of chemicals by diverting a part of the water, or other liquid to be treated, through or in contact with the chemical, thereby to pick up, dissolve or combine with a portion of the chemical, the amount of chemical taken up and returned to the main supply with the diverted part being proportional to the amount diverted, which amount is or may be regulated so as to bear a definite ratio to the amount of liquid in or flowing through the main supply, thus keeping a constant ratio between the quantity of chemical taken up and the main supply.

Referring to the accompanying drawing wherein I have illustrated means for carrying out my invention, Fig. 1 is a sectional view of my chemical apportioning and feeding device connected to feed chemical to a water main.

Figs. 2 and 3 are similar views showing different forms of inlet pipes.

Figs. 4 and 5 show another form of inlet pipe.

Fig. 6 is a cross sectional view of the inlet pipe taken on line 6—6 of Fig. 3.

Referring now to Fig. 1, and assuming that water containing carbon dioxide in solution is to be treated to prevent or neutralize its rusting or corrosion of the pipe lines or tanks, the main water supply pipe 8 leads to a tank or reservoir or may be connected direct to the distributing system. At some point in the supply pipe 8 between its source and the tank or distributing system, I connect my chemical apportioning device which comprises a tank 9 and inlet and outlet pipes 10, 11, forming with the tank a shunt on the main supply pipe 8. By this means a definite controlled portion of the water from the main 8 is diverted through pipe 10, tank 9, and returned through pipe 11 to the main carrying with it a definite amount of chemical (in this case sodium silicate) that is contained in tank 9.

The tank 9 has a filling plug 12 and two or more pet cocks or sampling cocks 13 for determining the height of the chemical C therein. The top of the tank is filled with water W or a solution of water and chemical which is lighter than the chemical C, which is kept within limits between the cocks 13, or if desired a gauge glass may be used in place of the cocks so that the height of the chemical may be seen at all times. The upper end of pipe 10 projects into the path of water flowing in main 8 and its upper end is cut off at an angle 14 or may be in the form of a Pitot tube presented toward the direction of flow. The lower end of inlet pipe 10 (Fig. 1) within tank 9 is connected to a flexible tube 15 at the lower end of which is a nozzle 16 carried by a float 17 and having an orifice or perforation 18 discharging a fixed distance below the surface of the chemical C. The float 17 is guided by the filling pipe 19 and of course is of such a buoyancy that it will remain submerged in the water solution W but will float on the chemical C. The outlet pipe 11 is connected to the top of tank 9 and its upper end discharges into main 8. The pipes 10 and 11 are provided with shut off valves 20, 21, and one of them, preferably the inlet pipe is provided with a regulating valve 22 which is set to control the amount of water shunted through pipe 10 and consequently the amount of chemical picked up by it and returned to the main through pipe 11 in accordance with the properties of the water to be treated. The end of nozzle 16 extends a definite distance into the chemical C so that the amount of chemical picked up, dissolved or combined with it is always proportional to the amount of water flowing from the nozzle. The two pipes 10 and 11 being connected through the tank 9, there is a difference in pressure established between the inlet to pipe 10 and the discharge end of pipe 11 due to the Pitot tube, (or its equivalent) which is a function of the rate of flow in the main 8 so that the flow resulting through pipes 10 and 11 and tank 9 is always proportional to the flow in the main.

Flow being established in the main conduit 8 results in a proportional flow being established in connections 10, 11, all in the direction as indicated by the arrows, viz., through pipe 10, valve 22, and into flexible hose or movable pipe 15, which leads the stream to the tube 16, allowing the stream to penetrate an adjustable, though fixed depth ($h$) of the chemical C to be introduced. The stream, by reason of this penetration effects the solution of part of the chemical which emerges to the liquid W in the upper part of the container and is delivered to and mixes with the main stream flowing in conduit 8 through pipe 11. To assure constancy of feeding, requires the depth ($h$) to remain a constant. This I accomplish by attaching the tube 16 to a float adapted to float upon the surface of the chemical C but to sink in the diluted solution, of supernatant liquid W. Valves 20 and 21 are shut off when it is desired to add to the quantity of chemical in tank 9. Sampling cocks 13 are used to determine the depth of the chemical in the tank or an external gauge glass may be used for the same purpose. The tank is recharged or filled through the opening closed by plug 12, which gives access to the filling pipe 19 that extends nearly to the bottom of the tank 9. The heavy chemical poured into this pipe emerges at the bottom of the tank and as it rises in the tank forces the water out through the top pet cock 13. When the level of the chemical reaches the upper cock 13, the plug 12 is replaced and the cock 13 closed. The tank is now charged and again ready for use.

Fig. 2 is another embodiment of the same principle that I have shown in Fig. 1. The flow being established in the same manner as previously described, the divided stream is led through pipe 10 and valve 22 into a pipe 23, which extends preferably almost to the bottom of the tank. This pipe has a lateral discharge opening consisting of a series of perforations or orifices 24 extending throughout its length. The flow in the pipes 10 and 23 exerts a pressure within the pipe which depresses the chemical liquid within the pipe below the surface of the chemical surrounding the pipe by a distance ($h$), thereby allowing fluid from the holes 24 to penetrate the chemical through the distance ($h$), effecting a solution which is fed into the conduit 8 in a manner exactly analogous to that already described. The extent of the depression ($h$) is a measure of the loss of head occurring through the pipe 23 and is a function of the flow in conduit 8 and to the number of holes uncovered by the chemical C. Hence in this embodiment, if the perforations 24 be all of the same size, the ratio of chemicals fed will gradually decrease as the chemical surface decreases. This error of feeding may be brought within appropriate limits by proper design of the number and size of the holes or slots 24 in the pipe 23 and the selection of the diameter of this pipe.

When the chemical C is sodium silicate, its specific gravity as compared with water is approximately 1.381, so that the difference in specific gravities of the two liquids when treating water in the main 8 is only 0.381. When the orifices 24 in the inlet pipe 23 are close together (from 1 to 2 inches apart) as they are for water treatment, a very slight flow or velocity head in the inlet pipes 10, 23 will depress the silicate a distance $h$ sufficient to uncover more than one orifice. The number of orifices uncovered, and hence the depth of penetration in the chemical, therefore is proportional to the flow in the inlet pipe or to the amount of water diverted, except for the very small increments of flow or pressure required to depress the chemical from one orifice to the next. Or, stated in other words, the amount of chemical fed is always a function of the flow in the inlet pipe. If the vertical distance between orifices 24 is only 1½ inches, then a difference in pressure or variation in velocity head in pipes 10, 23 of only ⅓ oz. per square inch will depress the silicate from one orifice to the next. These increments of pressure are so slight, that the number of orifices uncovered and hence the amount of chemical picked up are directly proportional to the flow in the water main or to the amount of water diverted. Of course, there are infinitesimal variations, but for all practicable purposes, there are none.

Of course, if the holes 24 are less than 1½ inches apart, then the pressure necessary to depress the silicate a depth equal to the distance from hole to hole becomes less than ⅓ oz. per square inch.

In Figs. 3 to 6, I have shown a form of inlet pipe wherein the depth of the chemical penetrated by the diverted liquid always is exactly proportional to the velocity head in the inlet pipe or rate of flow in the main 8. In this figure I have omitted the Pitot tube 14 and in its stead show a disc 25 in the main 8 between the connections to the inlet and outlet pipes 10, 11. This disc has an orifice 26 less than the diameter of the main 8 so that the flow is restricted at this point to cause a pressure differential between the pipes 10 and 11. The size of the orifice 26 is dependent upon the velocity in the main 8, but for the usual water installations wherein the flow very seldom, if ever, reaches its permissible maximum, the area of the orifice usually is from ⅓ to ½ the area of the main. The rate of flow thru the inlet pipe 10 is then controlled by the regulating valve 22, which, when once set for determined operating conditions, need not be reset but may be locked so as to prevent tampering. Of course, the Pitot tube 14 may be used in Fig. 3 instead of the disc 25, and vice versa, the disc 25 may be used instead of the Pitot tubes in Figs. 1 and 2.

The inlet pipe 10, Fig. 3, is connected to the pipe 27 extending substantially to the bottom of tank 9 and instead of the spaced holes 24 there is a single lateral discharge opening in the form of a narrow slot 28, Fig. 6, extending from a point near its upper end to the lower end. Water entering through the inlet 10 will depress the chemical (sodium silicate) within the pipe 27 an amount $h$ proportional to the velocity head in the pipe and will penetrate a depth $h$ of the chemical as it flows out through the slot 28 on its way to the outlet pipe 11 and thence back to the main 8. With this form of inlet pipe 27, the depth of penetration of the chemical, and hence the amount of chemical fed to the main will be not only a function of the rate of flow in the main but also will be exactly proportional thereto for all velocities.

Figs. 4 and 5 show a pipe 29 that may be substituted for either pipe 23 or pipe 27 and will result in proportioning the amount of chemical exactly to the rate of flow in the main 8. This pipe 29 has a lateral discharge opening consisting of a number of slots which are arranged in series 30, 31 so that as the end of one series is reached by the depressed liquid the next series opens up. The effect of these series or staggering of the slots is the same as though there were one continuous narrow opening, but the pipe is stronger and more rigid than it is when there is but a single slit as in Figs. 3 and 6.

In the above described manner, I accomplish the apportioning of chemicals to a fluid supply with a degree of precision which can be fixed in the design to suit the requirements of the particular application. When the properties of the water in the main have been determined and the regulating valve 22 set, the valve may be locked or fixed in that position and needs no further adjustment unless the quality of the water changes. Variations in the flow through the main and in the amount of water or other liquid to be treated are compensated by the apparatus itself. When once set, the valve 22 needs no further adjustment, and valves 20 and 21 are closed only when new chemical is added to the tank 9.

In time there will of course be some slight diffusion of the chemical into the water above, but because this diffusion is so slight and variable that it cannot be controlled, I aim to keep it at a minimum, and to assist in reducing this diffusion, I support the tank 9 on end so that a minimum of area of the chemical C is exposed to the water W. In my invention, as herein illustrated, the amount of chemical entering the water by diffusion is so small as to be negligible, not only because of the small area of chemical exposed, but also because of the continuous flow of water through the upper part of the tank 9.

By having the inlet pipe discharge at a definite depth in the chemical, I avoid agitation of the chemical and consequent uneven feeding thereof such as necessarily results when the water inlet pipe discharges into the top of the tank 9. In such a construction, when the velocity of the water or other liquid is high in the main 8, or when there is a sudden demand for water, there will be a corresponding spurt or jet of water discharged downward into the reservoir which will agitate the entire body of chemical and result in feeding a large amount of chemical for a considerable period after the peak demand has subsided. I overcome this uneven feeding of chemical and limit the agitation of the chemical by confining the turbulence to the vicinity of the point of discharge.

I have shown the regulating valve 22 in the inlet pipe 10, where it preferably is located, but it may be placed in the outlet pipe 11 in some instances.

I have described my invention as applied to a water system, but it is to be understood that it is not limited thereto, nor to the form of apparatus and method described, but will find use in many other arts and forms, and I claim as my invention all such that fall within the scope of the following claims.

What I claim is:

1. In a chemical apportioning device, the combination of a liquid supply conduit, a container partly filled with a treating chemical of greater specific gravity than the liquid in the supply conduit, an inlet pipe from said conduit to said container discharging laterally at a point below the level of the chemical therein, means for maintaining said discharge point a distance below the level of the chemical, an outlet pipe from said container above the level of the chemical therein to said supply conduit, means for shunting a portion of the liquid in said conduit through said inlet and outlet, whereby at least a part of the shunted liquid will flow through said chemical near its surface, and means for regulating the amount of liquid shunted through said inlet and outlet proportional to the amount of chemical to be taken up.

2. In a liquid treating device, a liquid supply conduit, a container for chemical for treating the liquid, means for shunting a part of the liquid through the chemical in said container only near the surface of the chemical and back to the conduit, means for determining the depth to which said shunted liquid penetrates the chemical, and means for varying the depth of penetration substantially proportional to the amount of liquid diverted.

3. In a chemical apportioning device, the combination of a liquid supply conduit, a container partly filled with a treating chemical of greater specific gravity than the liquid in the supply conduit, an inlet pipe from said conduit to said container discharging at a point below the level of the chemical therein, said inlet pipe within the container having a lateral discharge opening extending throughout its length whereby the lowest point of discharge will always be a distance below the level of the chemical substantially proportional to the rate of flow in said inlet pipe, an outlet pipe above the level of the chemical from the container to the supply conduit, means for creating a pressure differential between said inlet and outlet pipes proportional to the rate of flow in said supply conduit, and means to control the amount of liquid diverted through said inlet and outlet pipes due to said pressure differential.

4. In a liquid treating device, the combination of a liquid supply conduit, a container for treating chemical of greater specific gravity than the liquid in the supply conduit, an inlet pipe from said conduit into said container near its top and extending substantially to the bottom thereof, said inlet pipe having a lateral discharge opening adapted to discharge at different heights below the level of the treating chemical within the container, an outlet pipe from the top of the container above the level of the treating chemical to said conduit, means for creating a pressure differential between said inlet and outlet to cause a flow of liquid through said inlet, treating chemical, and outlet.

5. The method of adding chemical to a liquid flowing in a conduit which consists in diverting a part of the liquid proportional to the total amount flowing in the conduit through a body of chemical of varying surface level only near its surface, causing said diverted part of the liquid to flow through a depth of the chemical substantially proportional to the amount of liquid diverted, and then returning the diverted part to the conduit.

6. In a chemical apportioning device, the combination of a liquid supply conduit, a container partly filled with a treating chemical of greater specific gravity than the liquid in the supply conduit, an inlet pipe from the conduit extending substantially to the bottom of the container, said inlet pipe having a lateral discharge opening extending below the level of the chemical in the container, an outlet pipe from the container above the level of the chemical to the conduit, said outlet pipe being connected to the conduit beyond the inlet pipe in the direction of flow of liquid in the conduit, means for causing a difference in pressure in said conduit between the inlet pipe and outlet pipe connections thereto whereby liquid will flow into said container through said inlet pipe and depress the treating chemical therein below the normal level of the chemical an amount proportional to the rate of flow in said inlet pipe.

HENRY J. SAVAGE.